Nov. 9, 1965     D. E. LEE     3,217,157

ILLUMINATING REFLECTOR

Filed June 25, 1963

INVENTOR.
DONALD E. LEE
BY Henry W. Kaufmann
AGENT

United States Patent Office 3,217,157
Patented Nov. 9, 1965

3,217,157
ILLUMINATING REFLECTOR
Donald E. Lee, Abington, Pa., assignor to General Electric Company, a corporation of New York
Filed June 25, 1963, Ser. No. 290,421
3 Claims. (Cl. 240—41.1)

This invention pertains to the art of optics, specifically to the production of highly uniform illumination of surfaces by reflected radiation. For certain purposes, particularly for simulating, by radiation from a comparatively nearby source, the radiation which is produced naturally by a distant source of restricted angular magnitude, it is known to employ a portion of a paraboloidal reflector, located over the area to be illuminated, to collimate and reflect upon the surface radiation falling upon the reflector. In order that light so reflected may accurately represent in its angular distribution radiation incident from a remote source such as an astronomical body, it is necessary that the reflector be accurately paraboloidal, not only at the time of its fabrication but after it is actually mounted above the plane to be illuminated. Because of the long optical paths which may be involved in such a device, comparatively small distortions of such a reflector will, because they are magnified by the long optical path, produce comparatively large effects. The mounting of an accurately shaped device such as a paraboloidal mirror in such a way that the mirror will not be distorted not only requires rather elaborate calculation and design, but it also results in a structure which, merely because of its mass and complexity, tends to be quite expensive.

It is, of course, old in geometry and the art of optics to approximate a continuous curve or surface by a succession of straight lines or plane surfaces. However, in most of the instances in which, for example, plane mirrors have been used to approximate paraboloidal mirrors, there has been comparatively little interest in the uniformity of illumination produced. Those who recall the conical reflectors lined internally with plane portions of mirror to approximate a circular cone, which illuminated the jewelry shops of yesteryear, will recall that these mirrors in operation produced bright areas where the light reflected from two or even three mirror segments was superimposed. I have invented a way of replacing a continuously curved paraboloidal reflector for such uses as I have described by a plurality of plane mirrors whose dimensions have been so chosen that each such reflector can provide a central portion of high and uniform intensity of illumination which, toward its edge, decreases linearly to zero. This linear decrease makes it possible for the portion illuminated jointly by two adjacent mirrors to be uniformly illuminated in those areas, since the linear decrease in illumination from one mirror may be equally compensated by the linear increase in illumination from the adjoining mirror.

Generally speaking, it is desirable to minimize the number of mirrors employed so far as is consistent with producing uniform illumination and with providing an adequate approximation to the geometry of the continuously curved surface. My invention achieves results which are compatible with these desired features. Specifically, I have found that the desired results are achieved by selecting a mirror of such dimensions that there is one and only one point of the illuminated surface from which it is possible to view, in the mirror, the entire light source. This particular mirror aperture produces maximal density in the center of the illumination curve. A mirror whose aperture is insufficient to transmit the radiation from the entire light source will obviously produce lower density than one which can transmit the radiation from all source areas; and it has the further considerable disadvantage that with decreasing size is begins to approximate the function of a pinhole in a pinhole camera, and images the source on the illuminated plane, so that any non-uniformities in the brightness of the source (as, for example, if it is composed of a plurality of lamps in array) begin to appear as non-uniformities in the illumination. At the same time, a mirror which subtends appreciably more than the angle subtended by the source, would be too large to provide adequate simulation of the paraboloidal mirror, and would produce a large uniformly illuminated area which, overlapping light reflected by other similar mirrors, would produce excessively bright areas or "hot spots." Since the mirror dimension according to my teaching subtends the entire angle of the source at only one point, there will be an illuminated central point and then beyond this point, there will be a more or less uniform falling off as the mirror subtends less and less of the light source.

I therefore achieve by my invention the object of providing the most economical and most satisfactory approximation, for illumination purposes, of a continuously curved reflector by a plurality of plane reflectors. Economy, simplicity of installation, practical uniformity of a very high order are some of the ends I have thus achieved. Others will be apparent to those skilled in the art from the following description and specification. For the better understanding of my invention, I have provided figures of drawing in which.

Figure 1:
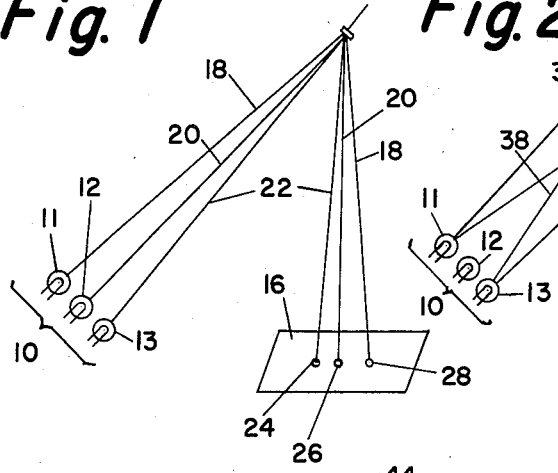
FIG. 1 represents a light source consisting of three lamps illuminating a mirror of very small dimensions, which produces on an illuminated plane three separate images of the three lamps.

Referring to FIG. 1, there are represented a light source 10 consisting of an array of three individual light sources 11, 12 and 13, represented for simplicity as incandescent lamps. A very small reflector 14 is located to receive light from array 10 and reflect it down to working plane 16. The beams of light from the various individual sources 11, 12 and 13 are represented respectively by single lines 18, 20 and 22 which extend from the individual sources to reflector 14 and are reflected down to plane 16, where they form small separate illuminated areas 24, 26 and 28. This separation of the illuminated areas results from the small dimensions of reflector 14, and illustrates the so-called "pinhole camera" effect as it obtains in such a system.

Figure 2:
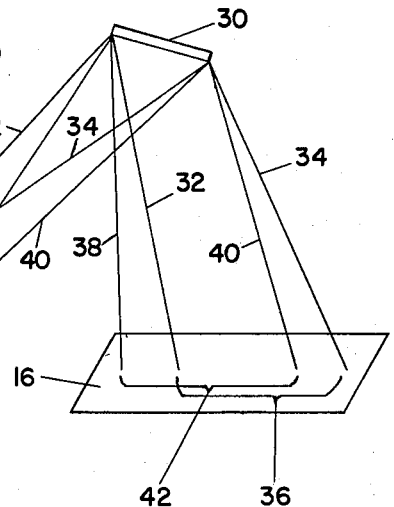
FIG. 2 represents a light source like that of FIG. 1, but represents the action of a very large mirror in producing regions of excessive brightness through overlapping of the light from the three lamps.

FIG. 2 represents light source 10 with its individual components 11, 12 and 13 as before. However, a very large plane reflector 30 receives from individual source 11 a broad beam of light which is bounded by rays 32 and 34, which extend upward to the opposite extreme edges of reflector 30 and are reflected downward thence to illuminate a range of plane 16 marked by a bracket bearing reference number 36. Similarly, the beam of light from individual source 13 is bounded by rays 38 and 40, which are reflected from extreme opposite edges of reflector 30 to plane 16 over a range marked by a bracket bearing reference number 42. It will be observed that brackets 36 and 40 overlap for a considerable distance; and this range in plane 16 will be illuminated by individual sources 11, 13 and any individual sources lying between them, such as 12. Thus it is evident that a reflector as large as that represented by 30 will direct illumination from all the individual light sources in source 10 to a large portion of plane 16. Similarly it is evident, by consideration of the reversibility of optical paths, that a viewer viewing source 10 from any point of plane 16 which lies within the overlapping part of brackets 36 and 42 will see the whole of source 10.

Figure 3:
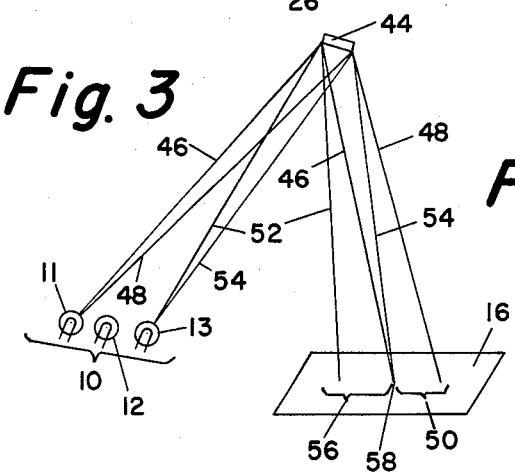
FIG. 3 represents a light source like that of FIG. 1, but represents the action of a single mirror dimensioned in accordance with my teaching in producing uniform illumination.

FIG. 3 represents light source 10, with its individual sources 11, 12 and 13, and a reflector 44 intermediate in dimensions between 14 of FIG. 1 and 30 of FIG. 2. Individual light source 11 illuminates reflector 44 by a beam whose boundary rays are 46 and 48, respectively. These rays 46 and 48 illuminate a range of plane 16 denoted by a bracket 50. Similarly, individual light source 13, at the other extreme of source 10, illuminates reflector 44 by a beam whose boundary rays are 52 and 54, and illuminate plane 16 over a range designated by bracket 56. It may be observed from the figure that rays 46 and 54 strike plane 16 at a common point 58, so that brackets 50 and 56 are tangent, but not overlapping. Individual light sources intermediate between 11 and 13, such as 12 will, of course, also illuminate central point 58. This point 58 is thus the only one in the entire range encompassed by brackets 50 and 56 which will be illuminated by *all* of the individual sources in generic source 10. By the reversibility of optical paths, it is also apparent that point 58 is the only one in the plane from which all of source 10 may be seen. This requirement determines the dimension of reflector 44; it results in one central point 58 which is illuminated to a maximum level, by receiving light from all parts of source 10; as one departs from point 58, increasingly less and less of source 58 supplies illumination.

For simplicity of representation and explanation, the effect of reflector dimensions has been represented only in one plane; it is, of course, apparent that reflector dimensions in a direction normal to the planes of the figures will have the same effect as here described, and that the dimension of reflector 44 normal to the plane of FIG. 3 should, in accordance with my teaching, be such that one viewing source 10 from point 58 will see just all of source 10 in both its dimension in the plane of the figure and in its dimension normal to that plane. However, it is not necessary to go to such lengths in meeting this criterion as to tailor the shape of individual reflectors exactly to conform to the shape established by the shape of the light source; for example, reflectors may be rectangular so that they form a practically continuous reflecting surface, provided that their length and width comply substantially with the criterion, although it would, of course, be preferable that the shape of the light source also approximate a rectangle.

Figure 4:
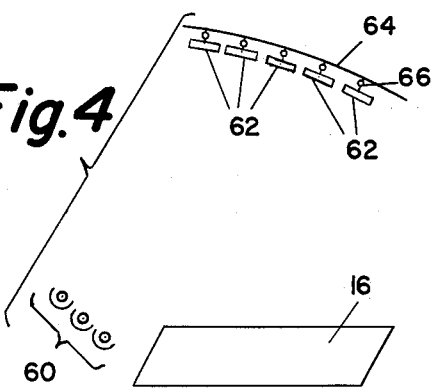
FIG. 4 represents an illumination system according to my invention which employs a plurality of mirrors of optimum dimensions to produce uniform illumination on the working plane.

FIG. 4 represents the application of reflectors of these particular dimensions in accordance with my invention. A light source 60 is represented somewhat differently from source 10 of previous figures in that the individual light sources, which may be gas discharge lamps, are represented surrounded by reflectors to direct their radiation in the direction of a plurality of reflectors 62 which are supported from a surface 64 by ball joint supports 66 which can be adjusted to alter the orientation of reflectors 62. An alternative mounting which is more permanent in adjustment is by the use of conventional leveling screws holding reflectors 62 adjustably away from the surface 64 against the pull of a spring located in tension between 64 and each reflector 62; the leveling screws may pierce surface 64 through tapped holes, and be adjustable from above. Working plane 16 may therefore be uniformly illuminated by adjustment of reflectors 62 in such fashion that the central bright portions which they produce individually (corresponding to point 58 of FIG. 3) are suitably spaced in a kind of lattice so that the decrease in illumination around any given central spot is supplemented by overlapping increasing illumination from an adjacent spot. This particular capability of adjustment has been found in practice to permit ready adjustment of illumination to produce a high order of uniformity; and the size of reflector represented in FIG. 3 has been found to be the optimum for such purpose. It is quite evident that a reflector so small as 14 of FIG. 1, which produces a pinhole type image of the individual sources of 10, would reproduce any irregularities in the face of light source 60. Similarly a reflector as wide as 30 of FIG. 2 has the disadvantage that it produces a very large highly illuminated area; and any adjustment of adjacent reflectors which would throw additional light into such a bright area would produce non-uniformities of illumination which could not be corrected readily by adjustment of any adjacent reflectors. Despite the apparent simplicity of my invention, the particular dimension of reflector 62 which has been described is actually quite critical in obtaining uniformity of illumination.

The shape of supporting surface 64 will ordinarily be an approximation to a paraboloid; but the approximation need not be very exact since adjustment of the orientation of reflectors 62 can adequately reproduce the *slope* of the required reflecting surface even though deviations in surface 64 may prevent the *elevation* of reflectors 62 above working plane 16 from being precisely that corresponding to an exact paraboloid. Furthermore, I have found that in practice, particularly where refractive optics such as condensing lenses are used, it is not always desirable that surface 64 actually be an exact mathematically determined surface. If, as is not uncommon, there is a greater brightness in the center of the pattern of illumination from source 60, it is desirable that the reflectors illuminated by this central portion be so located that they extend over a larger area of plane 16 than similar reflectors 62 which are located in the weaker portions of the illumination beam. To achieve this, surface 64 should actually be somewhat flatter in its central portion than a true paraboloid would be. The use of a reflector according to my invention has thus the advantage over a conventional shaped reflector that the shape of surface 64 need not be exact, since adjustment of the attitude of reflector 62 can compensate for such deviations; and, furthermore, surface 64 may be made to deviate from the mathematically expected form in order to compensate for deviations in other parts of the system. As a practical point, the fact that surface 64 need not be made reflecting, and the further fact that supports 66 may readily be made adjustable in length by any devices of the many well-known in the art, such as the turn buckle, render the ad hoc production of an acceptable surface 64 much easier than the preparation of a truly paraboloidal specularly reflecting surface, and incalculably easier than the preparation of a specularly reflecting surface which deviates empirically from a mathematically predictable curve.

Figure 5:
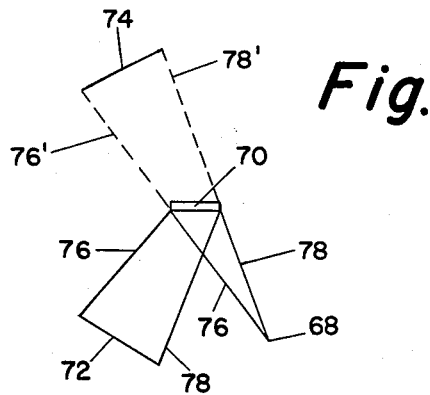
FIG. 5 represents a way of defining mirror dimensions.

FIG. 5 is provided for representing as simply as possible how the optimum dimensions of reflectors such as 62, 44, et al. are determined. Point 68 is a point in the working plane which is to be illuminated. Reflector 70 is located with its reflecting surface facing point 68. Source 72 is located so that just its entire width may be viewed in reflector 70, as image 74, from point 68. The bounding rays limiting the field of view are 76 and 78, their apparent reflected extensions being designated as 76' and 78'. A reflector of the dimensions shown for reflector 70 is said to subtend, when viewed from point 68, an angle equal to that subtended by light source 72.

The appended claims are written in subparagraph form, in accordance with the desires of the Commissioner of Patents, to facilitate reading, and not to indicate by subparagraphing any necessary physical subdivision or physical relation of structure.

What is claimed is:

1. A system for uniformly illuminating a portion of a plane comprising:
   a plane to be illuminated;
   an extensive source of radiation directed away from the said plane;
   a reflector system comprising a plurality of individual planar reflectors, extending over the portion of the plane to be illuminated, located to intercept radiation from the said extensive source, the said individual reflectors being of such dimensions as to subtend, with respect to a point on the said plane, substantially the solid angle subtended by the said extensive source, and being individually adjustable in angle.

2. A system for uniformly illuminating a portion of a plane comprising:
   a plane to be illuminated;
   an extensive source of radiation directed away from the said plane;
   a reflector system extending over the portion of the plane to be illuminated, located to intercept the radiation from the said extensive source, comprising:
     a plurality of plane reflectors of such dimensions as to subtend, with respect to a point on the said plane, substantially the solid angle subtended by the said extensive source, oriented in angle to distribute the said illumination substantially uniformly over the said portion of plane to be illuminated.

3. A system for illuminating a plane comprising, in combination:
   an extensive light source;
   a plane to be illuminated;
   a reflector system comprising a plurality of plane reflectors adjacent to each other, each said reflector being of such dimensions as to subtend, with respect to a point in the said plane, substantially the said extensive light source, the said plurality of plane reflectors being so oriented as to cause each said reflector to reflect the illumination from the said light source to a different central point in the said plane, the said reflected illumination from a said reflector overlapping reflected illumination from reflectors adjacent to it.

References Cited by the Examiner

UNITED STATES PATENTS

| 1,675,783 | 7/28 | Beal | 88—24 |
| 2,252,246 | 8/41 | Bergmanns et al. | 88—24 |
| 2,707,903 | 4/55 | Trombe | 88—24 |
| 3,001,061 | 11/62 | Moore | 240—41.35 |

FOREIGN PATENTS

| 639,287 | 3/28 | France. |
| 42,043 | 2/33 | France. (4th addition) |
| 798,325 | 7/58 | Great Britain. |

EVON C. BLUNK, *Primary Examiner.*

NORTON ANSHER, *Examiner.*